(No Model.)
J. MUDGETT.
HAY TEDDER TOOTH.
No. 274,640. Patented Mar. 27, 1883.
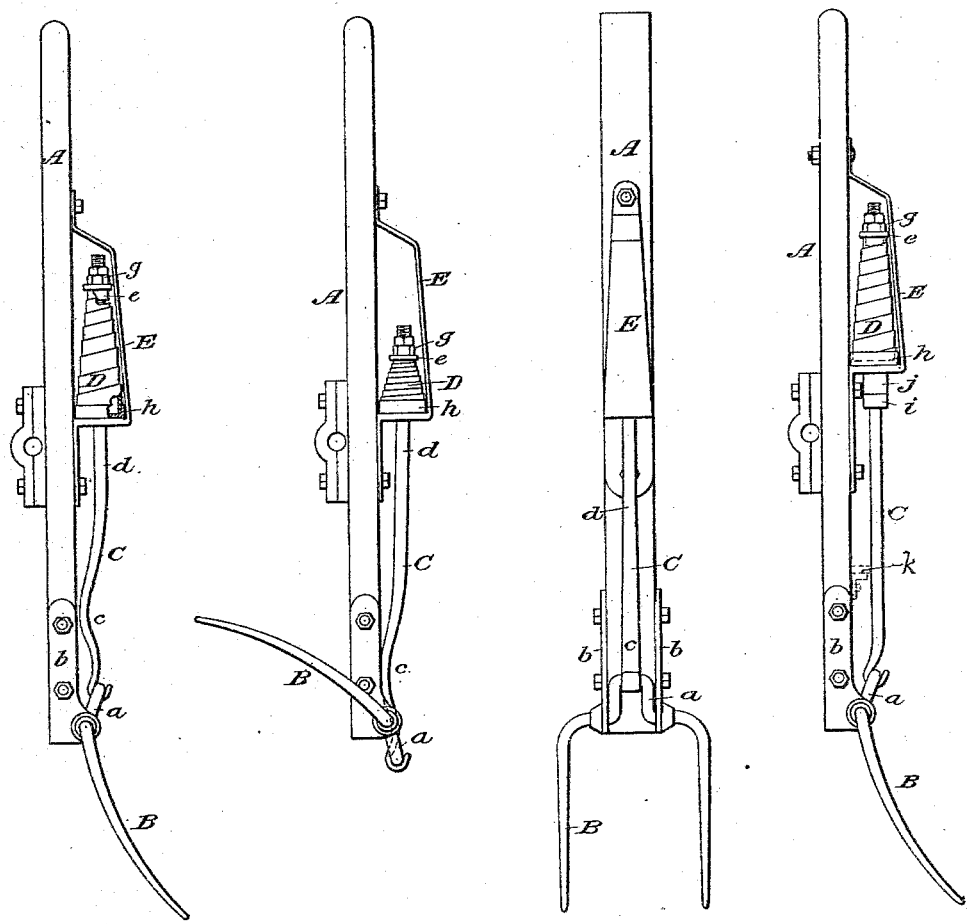
WITNESSES:
Geo. H. Fraser.
E. B. Bolton
INVENTOR:
John Mudgett
By his Attorneys,
Burke, Fraser & Hornets

UNITED STATES PATENT OFFICE.

JOHN MUDGETT, OF SOUTH TUNBRIDGE, VERMONT, ASSIGNOR OF ONE-HALF TO GEORGE A. MUDGETT, OF SAME PLACE.

HAY-TEDDER TOOTH.

SPECIFICATION forming part of Letters Patent No. 274,640, dated March 27, 1883.

Application filed November 23, 1882. (No model.)

*To all whom it may concern:*

Be it known that I, JOHN MUDGETT, a citizen of the United States, residing at South Tunbridge, Orange county, Vermont, have invented certain Improvements in Hay-Tedder Teeth, of which the following is a specification.

My invention relates to improvements in that class of hay-tedder teeth wherein the tines are kept up to their work by elastic pressure from springs, whereby when they meet obstructions of a formidable nature they will yield and pass over them, thus avoiding injury to the tedder.

Heretofore, so far as I am aware, such tedder-teeth have been provided only with flat leaf-springs of steel, which permit of only a limited swing of the tines, and have had no means of adjustment, whereby they soon become "set" or bent so as to leave the tines loose. They are also liable to be broken by sudden strains brought upon the teeth. An example of this kind of spring is shown in my patent of December 18, 1877, No. 198,410.

My present invention employs a volute spring arranged on the arm of the tooth and protected from fouling by a shield. This spring is provided with means whereby it may be adjusted or regulated as to strength or tension at any time, and it permits the tines to turn or swing back beyond a horizontal position, thus allowing all the clearance possible or necessary in passing obstructions. There are other novel features, which will be referred to hereinafter.

In the drawings, which serve to illustrate my invention, Figure 1 is a side elevation of the tedder-tooth with the tines in their normal position. Fig. 2 is a similar view, showing the teeth turned back to their fullest extent. Fig. 3 is a front view of the tooth, and Fig. 4 is a side elevation of a modification of the tooth.

A represents the arm or handle of the tooth, usually made of wood; and B, the fork, composed, as usual, of two tines formed from one bent rod or wire, usually of steel. This fork has a crank, $a$, bent in it, and has bearings in two side plates, $b\,b$, of metal, secured to the arm A. So far the device presents no novel features.

C is a rod, usually of steel, with a flattened and bent or curved extremity, $c$, in which is formed an eye to couple onto the crank $a$ of the fork, and an upper, preferably cylindrical, part, $d$, which passes up through a volute spring, D. In the top of this spring is a tubular bearing, $e$, (shown in Fig. 1 by the breaking away of the spring,) the flange on which rests on top of the spring. The upper end of the rod C is screw-threaded, and on it are screwed double nuts $g$, which bear on the part $e$. A single nut might, however, be used.

E is a shield or housing for the spring, secured firmly to the arm A, and provided with a cup-like holder, $h$, to receive and support the base of the spring. The rod C passes out through a slot or enlarged aperture in the bottom of the holder, which allows it some lateral play when the tines are sprung back. It will be seen that when the tines are sprung back, as shown in Fig. 2, the arched part $c$ of the rod C presses on the arm A and forms a stiff elastic bearing. By reference to Fig. 1 it will also be seen that this bowed part rests normally in close proximity to the arm, and when the teeth recoil after passing the obstruction this strikes and serves as an elastic cushion. When the spring gets set or slack after long use and requires tension, or where it is preferred to give it more tension for heavy grass, this can easily be accomplished by screwing down the nuts $g$ on the bearing $e$, which latter holds the spring steady and relieves it from chafing. The holder $h$ serves also to steady the spring and prevent it from playing laterally.

The guard or shield E prevents the grass or hay from clogging the spring by getting over its top or among its convolutions. Heretofore, so far as I am aware, the springs on tedder-teeth have been left exposed and unshielded, and this permits the springs to foul and compels frequent stoppage of operations to clean them out.

In Fig. 4, I have shown the rod C as a straight bar, and provided with a collar, $i$, to strike an elastic cushion, $j$, in the recoil. In other respects the construction is the same as that shown in the other figures. Another cushion may be mounted on the arm A, lower down, to serve as an elastic bearing for the collar to abut against when the teeth are thrown back. This cushion is indicated at *k* by dotted lines.

Having thus described my invention, I claim—

1. The combination, in a tedder-tooth, of the arm or handle and the cranked tines pivoted thereto, the volute spring D, mounted on the front of the arm or handle at its upper part, and the connecting-rod, arranged substantially parallel with the arm, and having its one end connected with the crank on the tines, and its other end adjustably connected with the volute spring, as shown, whereby the tension of the said spring may be regulated by means of a nut on the said rod, and all of the parts arranged to operate as set forth.

2. The combination, with the arm, the pivoted tines, and the volute spring, of the connecting-rod C, provided with a bowed spring-like extremity, *c*, arranged to operate substantially as set forth.

In witness whereof I have hereunto signed my name in the presence of two subscribing witnesses.

JOHN MUDGETT.

Witnesses:
 JUNIUS WENTWORTH,
 GEORGE A. MUDGETT.